(12) United States Patent
Ou

(10) Patent No.: US 8,392,794 B2
(45) Date of Patent: Mar. 5, 2013

(54) NON-VOLATILE MEMORY DEVICE AND DATA PROCESSING METHOD THEREOF

(75) Inventor: Hsu-Ping Ou, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 333 days.

(21) Appl. No.: 12/785,940

(22) Filed: May 24, 2010

(65) Prior Publication Data

US 2011/0197107 A1   Aug. 11, 2011

(30) Foreign Application Priority Data

Feb. 9, 2010   (TW) ................................ 99103901 A

(51) Int. Cl.
*H03M 13/00* (2006.01)
(52) U.S. Cl. .................... 714/758; 714/763; 714/718
(58) Field of Classification Search ................ 714/758, 714/763, 718
See application file for complete search history.

(56) References Cited

U.S. PATENT DOCUMENTS

| | | | |
|---|---|---|---|
| 6,781,895 B1 * | 8/2004 | Tanaka et al. ................. | 365/200 |
| 7,128,270 B2 * | 10/2006 | Silverbrook et al. .... | 235/472.01 |
| 7,605,940 B2 * | 10/2009 | Silverbrook et al. ........ | 358/1.17 |

* cited by examiner

*Primary Examiner* — Fritz Alphonse
(74) *Attorney, Agent, or Firm* — Wang Law Firm, Inc.; Li K. Wang; Stephen Hsu

(57) ABSTRACT

A data processing method for a non-volatile memory device is provided. The non-volatile memory device includes a controller and a NAND flash memory. First, a target command and a corresponding target address are serially transmitted from the controller to the NAND flash memory. Then, the NAND flash memory calculates a first value according to the target address. Moreover, a cyclic redundancy check code corresponding to the target address is transmitted from the controller transmits to the NAND flash memory. Next, the NAND flash memory determines whether a transmission error has occurred by performing a cyclic redundancy check according to the first value and the cyclic redundancy check code. When the transmission error has occurred, a status register is set to inform the controller to re-transmit the target command and the corresponding target address.

16 Claims, 7 Drawing Sheets

NON-VOLATILE MEMORY DEVICE AND DATA PROCESSING METHOD THEREOF

CROSS REFERENCE TO RELATED APPLICATIONS

This Application claims priority of Taiwan Patent Application No. 99103901, filed on Feb. 9, 2010, the entirety of which is incorporated by reference herein.

BACKGROUND OF THE INVENTION

1. Field of the Invention

The disclosure relates generally to a non-volatile memory device, and, more particularly to a NAND flash memory and a data processing method thereof.

2. Description of the Related Art

Non-volatile memories, such as flash memories, may be electrically erased and reprogrammed, as well as have the benefits of small size, low power consumption, and low cost features. Therefore, they are commonly used in a variety of consumer electronic devices for general storage and transfer of data, including mobile phones, digital cameras, personal digital assistants (PDAs) and so on.

Flash memories may include NAND flash memories and NOR flash memories. Compared to the NOR flash memories, the NAND flash memories may provide lower cost, larger memory capacity, and faster write speed and erase speed. Thus, NAND flash memories commonly serve as storage media of portable storage devices for storing various kinds of multimedia data.

Generally, when the NAND flash memories are accessed, the accessed data is serially transmitted. Moreover, with the advent of high speed data transfer rates, data transmission becomes more susceptible to noises, thereby substantially increasing the occurrence of data transmission errors. In this situation, since conventional NAND flash memories are unable to immediately detect that data transmission errors have occurred, it is unlikely to determine whether the accessed addresses or data are correct. Further, incorrect accessed addresses and data may result in erroneous programming or inaccessibility of data stored therein.

Therefore, it is desirable to provide a data processing method for the NAND flash memories, which is capable of immediately detecting occurrence of transmission errors during operation of the NAND flash memories, such that appropriate actions may be taken in advance for improving reliability of the NAND flash memories.

BRIEF SUMMARY OF THE INVENTION

An embodiment of a data processing method for a non-volatile memory device is provided. The non-volatile memory device comprises a controller and a NAND flash memory. First, the controller serially transmits a target command and a corresponding target address from the controller to the NAND flash memory. Next, the NAND flash memory calculates a first value according to the target address. Further, the controller transmits a cyclic redundancy check code corresponding to the target address to the NAND flash memory. Then, the NAND flash memory performs a cyclic redundancy check on the NAND flash memory according to the first value and the cyclic redundancy check code to determine whether a transmission error has occurred. In an embodiment, when the transmission error has occurred, a status register is set to inform the controller to re-transmit the target command and the corresponding target address.

In addition, an embodiment of a data processing method for a non-volatile memory device is provided. The non-volatile memory device includes a controller and a NAND flash memory. First, the controller serially transmits a read command and a corresponding read address to the NAND flash memory. Next, the NAND flash memory performs a read operation according to the read address and serially transmits predetermined data to the controller. Further, the controller calculates a first value according to the predetermined data. Then, the NAND flash memory transmits a cyclic redundancy check code corresponding to the predetermined data to the controller. Moreover, the controller performs a cyclic redundancy check according to the first value and the cyclic redundancy check code to determine whether a transmission error has occurred. In an embodiment, when the transmission error has occurred, the controller may re-transmit the read command and the corresponding read address.

In addition, an embodiment of a non-volatile memory device is provided. The non-volatile memory device includes a controller, a bus and a NAND flash memory. The controller is used to provide a target command and a corresponding target address. The bus is used to serially transmit the target command and the corresponding target address. The NAND flash memory which is coupled to the controller via the bus includes a NAND flash array, an input/output circuit and an engine. The input/output circuit is used for receiving the target command the corresponding target address. The engine is coupled to the input/output circuit for calculating a first value according to the target address and performing a cyclic redundancy check according to the first value and a cyclic redundancy check code corresponding to the target address which is received from the controller, thereby determining whether a transmission error has occurred. In an embodiment, when the transmission error has occurred, the engine sets a status register to inform the controller to re-transmit the target command and the corresponding target address.

In addition, an embodiment of a non-volatile memory device is provided. The non-volatile memory device includes a controller, a bus and a NAND flash memory. The controller is used to provide a read command and a corresponding read address. The bus is used to serially transmit the read command and the corresponding read address. The NAND flash memory which is coupled to the controller via the bus includes a NAND flash array, an input/output circuit and an engine. The NAND flash array is used to perform a read operation according to the read address. The input/output circuit is used to serially transmit predetermined data read from the NAND flash array to the controller via the bus. The engine is coupled to the input/output circuit to transmit a cyclic redundancy check code corresponding to the predetermined data to the controller. The controller calculates a first value according to the predetermined data and performs a cyclic redundancy check according to the first value and the cyclic redundancy check code to determine whether a transmission error has occurred. In an embodiment, when the transmission error has occurred, the controller re-transmits the read command and the corresponding address.

A detailed description is given in the following embodiments with reference to the accompanying drawings.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
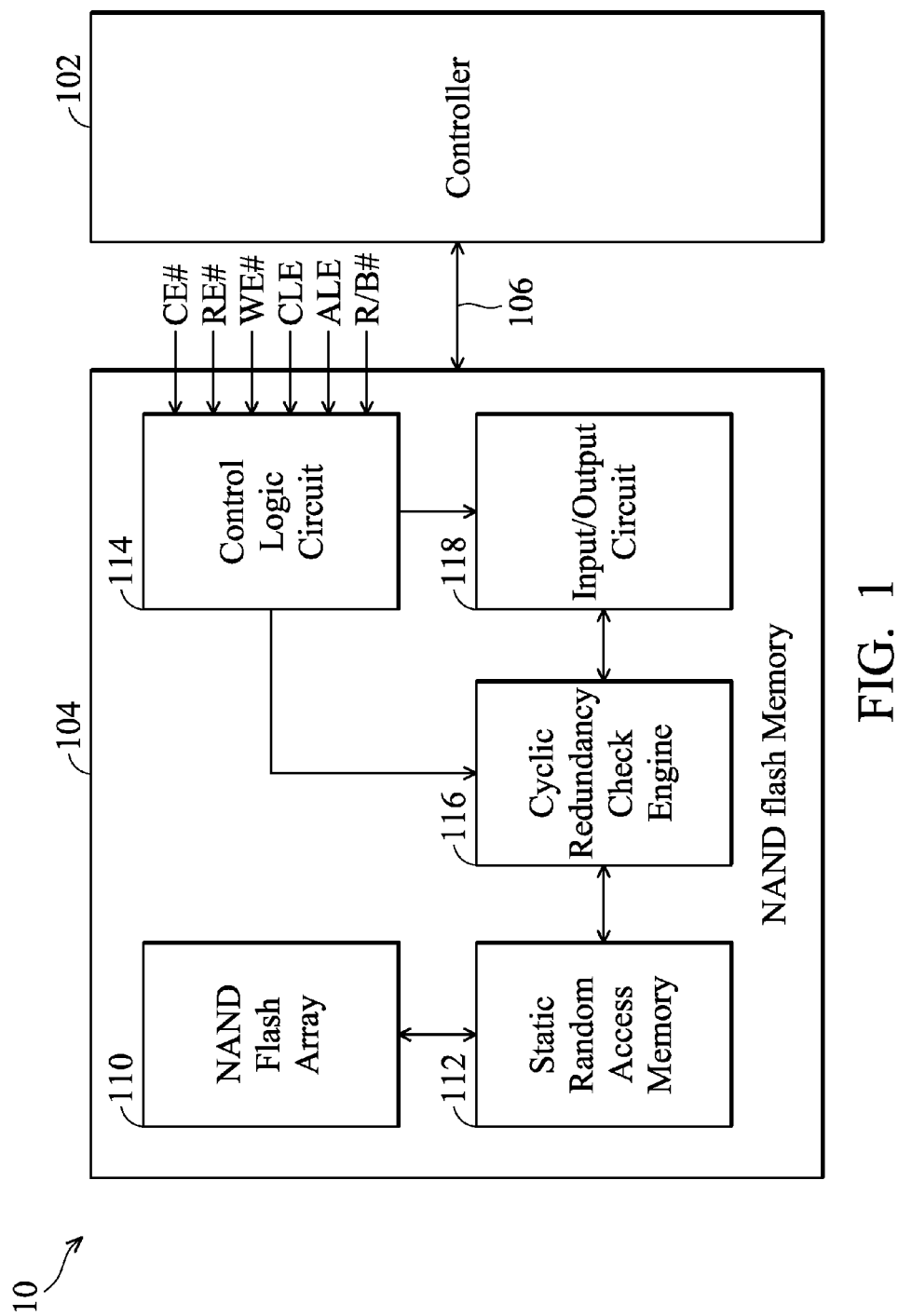
FIG. 1 is a block diagram illustrating a non-volatile memory device according to an embodiment of the invention.

FIG. 1 is a block diagram illustrating a non-volatile memory device 10 according to an embodiment of the invention.

According to the embodiment of FIG. 1, the non-volatile memory device 10 includes a controller 102 and a NAND flash memory 104. The controller 102 is used to provide a target command and a corresponding target address from an external host (not shown in FIG. 1). The controller 102 is coupled to the NAND flash memory 103 via a bus 106, such as a universal serial bus (USB), to serially transmit the target command and the corresponding target address to the NAND flash memory 104.

In an embodiment, the non-volatile memory device 10 may be packaged into different storage media, such as a secure digital (SD) card, a multimedia card (MMC), a micro SD card, a memory stick (MS) card, a MS Pro card, and so on. In addition, the controller 102 and the NAND flash memory 104 may be manufactured in respective integrated circuit packages.

Moreover, the NAND flash memory 104 includes a NAND flash array 110, a static random access memory (SRAM) 112, a control logic circuit 114 and an input/output circuit 118. According to an embodiment, the NAND flash array 10 may further include a plurality of memory banks and each memory bank may include a plurality of memory cells arranged in a matrix.

Referring to FIG. 1, the control logic circuit 114 receives multiple access signals from the controller 102. In an embodiment, the access signals may include a chip enable signal (CE#), a command latch enable signal (CLE), an address latch enable signal (ALE), a write enable signal (WE#), a read enable signal (RE#) and a ready/busy signal (R/B#). The input/output circuit 118 receives the target command, the corresponding target address or data to be written, which are issued from the controller 102 via the bus 106, and then latches the target command and the corresponding target address according to the access signals. The NAND flash array 110 performs programming operations, read operations and erase operations according to the latched target command and the corresponding target address. For example, when the target command corresponds to a read operation, the NAND flash array 110 may read data stored therein according to the latched target address and temporarily store the read data into the static random access memory 112. Afterwards, the input/output circuit 118 transmits the read data to the controller 102 via the bus 106.

According to the embodiment of FIG. 1, the NAND flash memory 104 further includes a cyclic redundancy check (CRC) engine 116, which is coupled to the input/output circuit 118. When the input/output circuit 118 receives the address or data issued from the controller 102 via the bus 106, the cyclic redundancy check engine 116 is used to detect transmission errors of the address or data in real time and take appropriate actions. A detailed description of a data processing method is illustrated herein below with reference to FIGS. 2 to 7.

Figure 2:
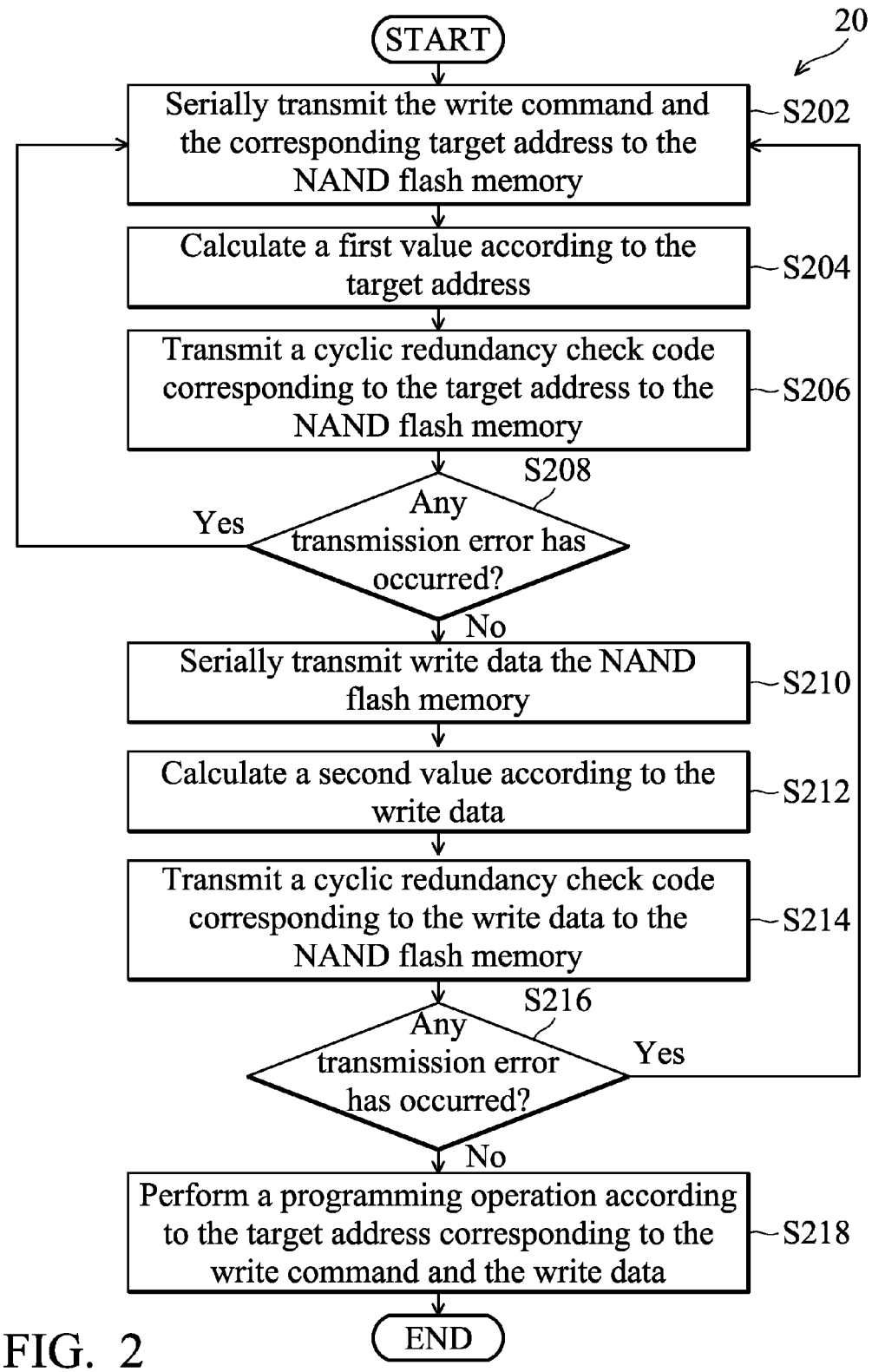
FIG. 2 is a flowchart illustrating a data processing method according to an embodiment of the invention.
Figure 3:
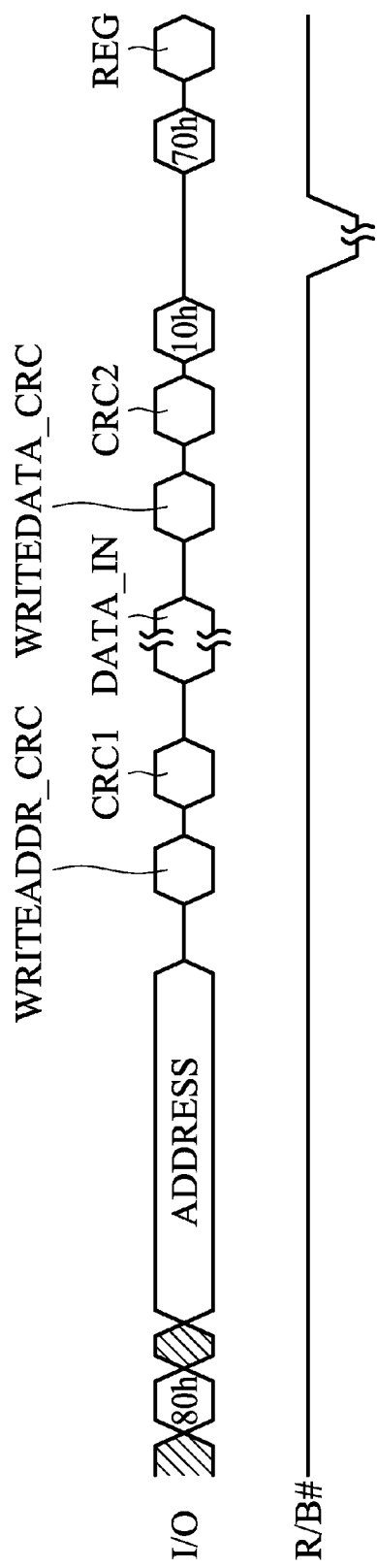
FIG. 3 is a timing diagram illustrating a programming operation according to an embodiment of the invention.

FIG. 2 is a flowchart illustrating a data processing method 20 according to an embodiment of the invention. FIG. 3 is a timing diagram illustrating a programming operation according to an embodiment of the invention.

Referring to FIGS. 1 to 3, it is assumed that the external host (not shown) is attempting to write data into the non-volatile memory device 10. The external host first transmits a first write command 80h and a corresponding target address ADDRESS to the controller 102.

Afterwards, the controller 102 serially transmits the first command 80h and the corresponding target address ADDRESS to the input/output circuit 118 of the NAND flash memory 104 via the bus 106 (step S202). In an embodiment, the target address ADDRESS may include a column address and a row address to indicate the write address of the NAND flash array 110.

Specifically, the controller 102 further transmits a write address cyclic redundancy check command WRITEADDR_CRC to the NAND flash memory 104. In response to the write address cyclic redundancy check command WRITEADDR_CRC, the cyclic redundancy check engine 116 then calculates a first value according to the target address ADDRESS (step S204).

Next, the controller 102 transmits a cyclic redundancy check code corresponding to the target address ADDRESS, such as CRC1 as shown in FIG. 3, to the NAND flash memory 104 (step S206). In an embodiment, the first value and the cyclic redundancy check code CRC1 may be generated according to the CRC-7 polynomial, but is not limited thereto.

Moreover, the cyclic redundancy check engine 116 performs a cyclic redundancy check according to the first value and the cyclic redundancy check code CRC1 to determine whether transmission error has occurred (step S208).

According to an embodiment, when the first value matches the cyclic redundancy check code CRC1, it indicates that the received target address ADDRESS is correct. Otherwise, when the first value does not match the cyclic redundancy check code CRC1, it indicates that some transmission errors have occurred due to the abnormity of the bus 106 or noise interference, thus resulting in undesired loss or damage of the target address ADDRESS during transmission.

Specifically, when the cyclic redundancy check fails, i.e., some transmission errors have occurred, the cyclic redundancy check engine 116 directly sets a status register (not shown) to inform the controller 102 to re-transmit the first write command 80h and the target address ADDRESS.

Meanwhile, when the cyclic redundancy check is successful, the controller 102 serially transmits write data DATA_IN to the input/output circuit 118 of the NAND flash memory 104 via the bus 106 (step S210). In an embodiment, the write data DATA_IN may be temporarily stored in the static random access memory 112.

Following, the controller 102 further transmits a write data cyclic redundancy check command WRITEDATA_CRC to the NAND flash memory 104. Similarly, in response to the write data cyclic redundancy check command WRITEDATA_CRC from the controller 102, the cyclic redundancy check engine 116 calculates a second value according to the write data DATA_IN (step S212).

Next, the controller 102 transmits a cyclic redundancy check code corresponding to the write data DATA_IN, such as CRC2 as shown in FIG. 3, to the NAND flash memory 104 (step S214). In an embodiment, the second value and the cyclic redundancy check code CRC2 may be generated by the CRC-7 polynomial, but is not limited thereto.

Moreover, the cyclic redundancy check engine 116 performs a second cyclic redundancy check according to the second value and the cyclic redundancy check code CRC2 to determine whether any transmission error has occurred (step S216). Similarly, when the cyclic redundancy check associated with the second value and the cyclic redundancy check code CRC2 fails, i.e., some transmission errors have occurred, the cyclic redundancy check engine 116 directly sets the status register to inform the controller 102 to re-transmit the first write command 80h and the target address ADDRESS.

When the second cyclic redundancy check is successful, it indicates that the controller 102 has transmitted the target address ADDRESS and the write data DATA_IN without any transmission error. In this situation, the controller 102 transmits a second write command 10h to the NAND flash memory 104. In response to the second command 10h, the NAND flash array 110 performs a programming operation based on an indication of the ready/busy signal R/B# (step S218). That is, the NAND flash array 110 serially writes the write data DATA_IN into the target address ADDRESS. After the programming operation is finished, the controller 102 then transmits a read status command 70h to the NAND flash memory 104 to read a status value REG of the status register. The status value REG of the status register may be used to inform the controller 102 that transmission error has occurred and data has successfully been written thereto.

Figure 4:
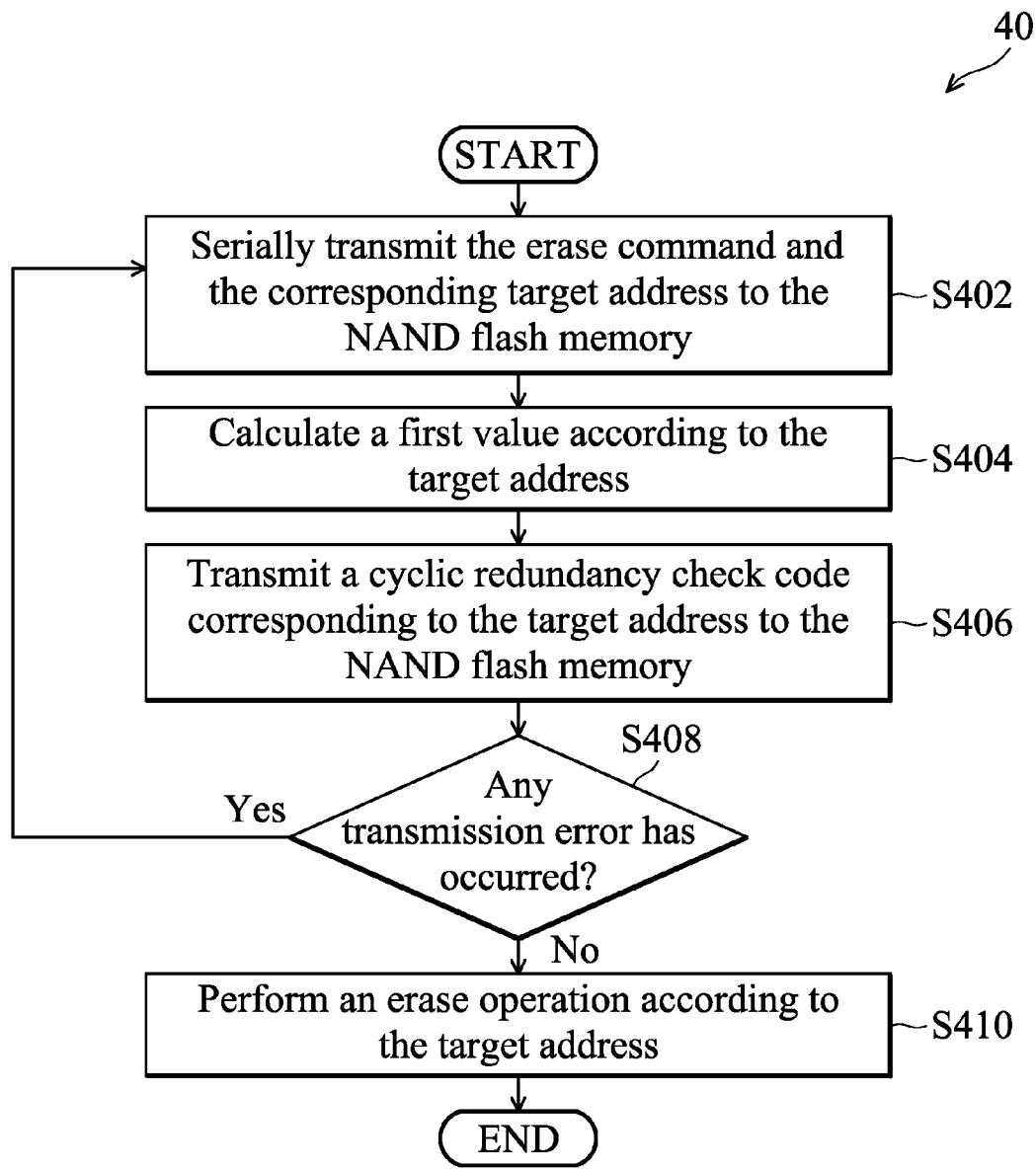
FIG. 4 is a flowchart illustrating a data processing method according to another embodiment of the invention.
Figure 5:
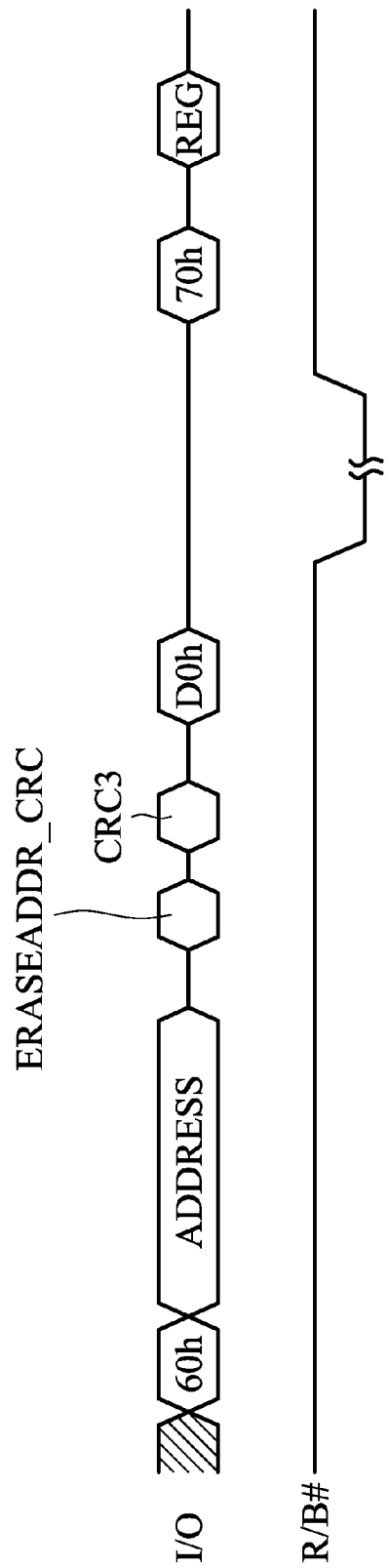
FIG. 5 is a timing diagram illustrating an erase operation according to an embodiment of the invention.

FIG. 4 is a flowchart illustrating a data processing method 40 according to another embodiment of the invention. FIG. 5 is a timing diagram illustrating an erase operation according to an embodiment of the invention.

Referring to FIGS. 1, 4 and 5, it is assumed that the external host (not shown) is attempting to erase specific data stored in the NAND flash memory device 10. The external host first transmits a first erase command 60h and a corresponding target address ADDRESS to the controller 102.

Similarly, the controller 102 serially transmits the first erase command 60h and the corresponding target address ADDRESS to the input/output circuit 118 of the NAND flash memory 104 via the bus 106 (step S402).

Next, the controller 102 transmits an erase address cyclic redundancy check command ERASEADDR_CRC to the NAND flash memory 104. In response to the erase address cyclic redundancy check command ERASEADDR_CRC, the cyclic redundancy check engine 116 calculates a first value according to the target address ADDRESS (step S404).

Then, the controller 102 transmits a cyclic redundancy check code corresponding to the target address ADDRESS, such as CRC3 as shown in FIG. 5, to the NAND flash memory 104 (step S406). In an embodiment, the first value and the cyclic redundancy check code CRC3 may be generated by the CRC-7 polynomial, but is not limited thereto.

Subsequently, the cyclic redundancy check engine 116 performs a cyclic redundancy check according to the first value and the cyclic redundancy check code CRC3 to determine whether any transmission error has occurred (step S408).

When the cyclic redundancy check fails, the cyclic redundancy check engine 116 sets the status value REG of the status register to inform the controller 102 to re-transmit the first erase command 60h and the target address ADDRESS.

In addition, when the cyclic redundancy check is successful, the controller 102 transmits a second erase command D0h to the NAND flash memory 104. In response to the second erase command D0h, the NAND flash array 110 performs an erase operation on the target address ADDRESS based on an indication of the ready/busy signal R/B# (step S410). As described above, after the ease operation is finished, the controller 102 transmits a read status command 70h to the NAND flash memory 104 to read the status value REG of the status register. The status value REG of the status register may be used to inform the controller 102 of transmission error and that the target address ADDRESS has been successfully erased.

Figure 6:
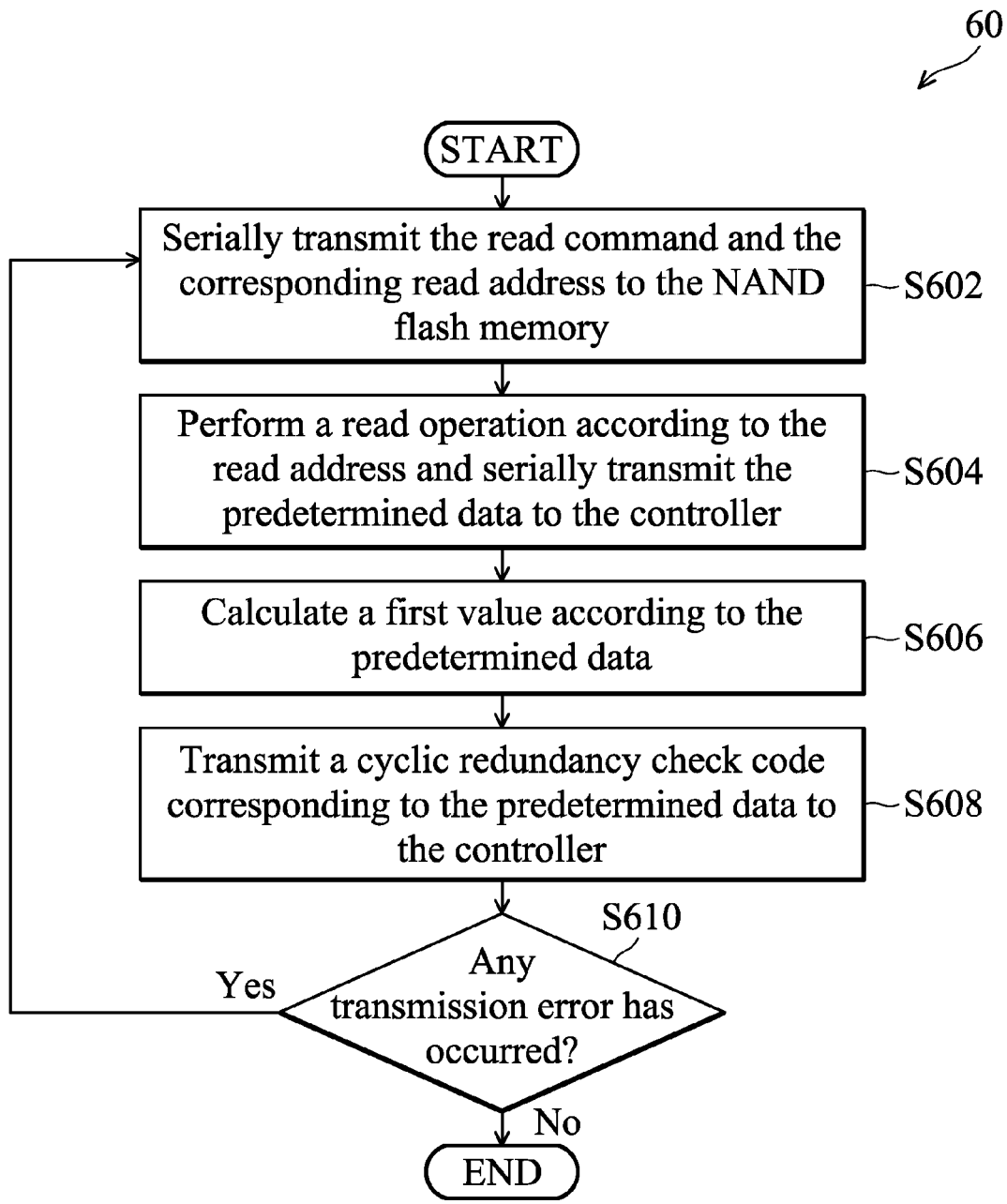
FIG. 6 is a flowchart illustrating a data processing method according to another embodiment of the invention.
Figure 7:
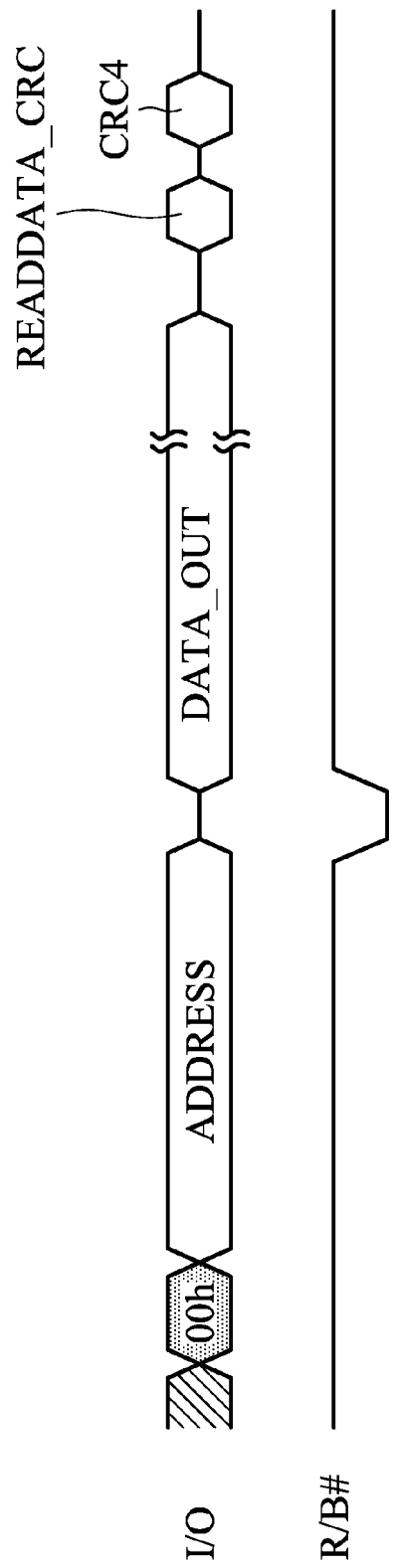
FIG. 7 is a timing diagram of a read operation according to an embodiment of the invention.

FIG. 6 is a flowchart illustrating a data processing method 60 according to another embodiment of the invention. FIG. 7 is a timing diagram of a read operation according to an embodiment of the invention.

Referring FIGS. 1, 6 and 7, it is assumed that the external host (not shown) is attempting to read predetermined data stored in the non-volatile memory 10. The external host first transmits a read command 00h and a corresponding read address ADDRESS to the controller 102.

Similarly, the controller 102 serially transmits the read command 00h and the corresponding read address ADDRESS to the input/output circuit 118 of the NAND flash memory 104 via the bus 106 (step S602).

Next, the NAND flash array 110 performs a read operation on the read address ADDRESS based on an indication of the ready/busy signal R/B# and stores the read predetermined data into the static random access memory 112. Subsequently, the input/output circuit 118 serially transmits the predetermined data DATA_OUT to the controller 112 via the bus 106 (step S604). Further, the controller 102 calculates a first value according to the received predetermined data DATA_OUT (step S606).

Additionally, the controller 102 transmits a read data cyclic redundancy check command READDATA_CRC to the NAND flash memory 104. In response to the read data cyclic redundancy check command READDATA_CRC, the cyclic redundancy check engine 116 transmits a cyclic redundancy check code corresponding to the predetermined data DATA_OUT, such as CRC4 as shown in FIG. 7, to the controller 102 (step S608). In an embodiment, the first value and the cyclic redundancy check code CRC4 may be generated by the CRC-7 polynomial, but is not limited thereto.

Then, the controller 102 performs the cyclic redundancy check according to the first value and the cyclic redundancy check code CRC4 to determine whether any transmission error has occurred (step S610).

When the cyclic redundancy check fails, the controller 102 re-transmits the read command 00h and the corresponding address ADDRESS.

From the aforementioned description, a non-volatile memory device, such as a NAND flash memory, and a data processing method thereof according to an embodiment of the invention may allow to immediately detect the occurrence of transmission errors in real time by using a cyclic redundancy check and thereby take appropriate actions; for example, inform the controller or the host to re-transmit the data. As such, reliability of the NAND flash memory is improved and backward compatibility thereof, with existing storage media protocols, may be desirably sustained.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data processing method for a non-volatile memory device, wherein the non-volatile memory device comprises a controller and a NAND flash memory and the data processing method comprises the steps of:
   serially transmitting a target command and a corresponding target address from the controller to the NAND flash memory;
   calculating a first value according to the target address by the NAND flash memory;
   transmitting a cyclic redundancy check code corresponding to the target address from the controller to the NAND flash memory;
   performing a cyclic redundancy check on the NAND flash memory according to the first value and the cyclic redundancy check code to determine whether a transmission error has occurred; and
   if the transmission error has occurred, setting a status value of a status register to inform the controller to re-transmit the target command and the corresponding target address.

2. The data processing method as claimed in claim 1, wherein the NAND flash memory calculates the first value in response to a first cyclic redundancy check command received from the controller.

3. The data processing method as claimed in claim 1, further comprising the steps of:
   determining whether the target command is a write command;
   if the target command is the write command, serially transmitting a write data corresponding to the write command from the controller to the NAND flash memory;
   calculating a second value according to the write data by the NAND flash memory;
   transmitting another cyclic redundancy check code corresponding to the write data from the controller to the NAND flash memory;
   performing the cyclic redundancy check on the NAND flash memory according to the second value and the another cyclic redundancy check code to determine whether the transmission error has occurred; and
   if the transmission has occurred, setting the status value of the status register to inform the controller to re-transmit the write command and the corresponding target address.

4. The data processing method as claimed in claim 3, wherein the NAND flash memory calculates the second value in response to a second cyclic redundancy check command received from the controller.

5. The data processing method as claimed in claim 3, further comprising the steps of:
   if there is no transmission error of the target address and the write data, performing a programming operation on the NAND flash memory according to the target address corresponding to the write command and the write data.

6. The data processing method as claimed in claim 1, further comprising the steps of:
   determining whether the target command is an erase command;
   if the target command is the erase command, and there is no transmission error of the target address, performing an erase operation on the NAND flash memory according to the target address.

7. A data processing method for a non-volatile memory device, wherein the non-volatile memory device comprises a controller and a NAND flash memory and the data processing method comprises the steps of:
   serially transmitting a read command and a corresponding read address from the controller to the NAND flash memory;
   performing a read operation on the NAND flash memory according to the read address and serially transmitting predetermined data to the controller;
   calculating a first value according to the predetermined data by the controller;
   transmitting a cyclic redundancy check code corresponding to the predetermined data from the NAND flash memory to the controller;
   performing a cyclic redundancy check on the controller according to the first value and the cyclic redundancy check code to determine whether a transmission error has occurred; and
   if the transmission error has occurred, informing the controller to re-transmit the read command and the corresponding read address.

8. The data processing method as claimed in claim 7, wherein the NAND flash memory transmits the cyclic redundancy check code to the controller in response to a cyclic redundancy check command received from the controller.

9. A non-volatile memory device, comprising:
   a controller for providing a target command and a corresponding target address;
   a bus for serially transmitting the target command and the corresponding target address; and
   a NAND flash memory coupled to the controller via the bus, comprising:
      a NAND flash array;
      an input/output circuit for receiving the target command and the corresponding target address; and
      an engine coupled to the input/output circuit for calculating a first value according to the target address and performing a cyclic redundancy check according to the first value and a cyclic redundancy check code corresponding to the target address received from the controller to determine whether a transmission error has occurred,
      wherein if the transmission error has occurred, the engine sets a status value of a status register to inform the controller to re-transmit the target command and the corresponding target address.

10. The non-volatile memory device as claimed in claim 9, wherein the engine calculates the first value in response to a first cyclic redundancy check command received from the controller.

11. The non-volatile memory device as claimed in claim 9, wherein the input/output circuit further determines whether the target command is a write command and receives a write data corresponding to the write command from the controller when the target command is the write command, and the engine calculates a second value according to the write data and performs the cyclic redundancy check according to the second value and another cyclic redundancy check code corresponding to the write data received from the controller to determine whether the transmission error has occurred, and wherein if the transmission error has occurred, the engine sets the status value of the status register to inform the controller to re-transmit the target command and the corresponding target address.

12. The non-volatile memory device as claimed in claim 11, wherein the engine calculates the second value in response to a second cyclic redundancy check command received from the controller.

13. The non-volatile memory device as claimed in claim 11, wherein if there is no transmission error of the target address and the write data, the NAND flash array performs a programming operation according to the target address and the write data corresponding to the write command.

14. The non-volatile memory device as claimed in claim 9, wherein the input/output circuit further determines whether the target command is an erase command, and if the target command is the erase command and there is no transmission error of the target address, the NAND flash array performs an erase operation according to the target address.

15. A non-volatile memory device, comprising:
 a controller for providing a read command and a corresponding read address;
 a bus for serially transmitting the read command and the corresponding read address; and
 a NAND flash memory coupled to the controller via the bus, comprising:
  a NAND flash array for performing a read operation according to the read address;
  an input/output circuit for serially transmitting predetermined data read from the NAND flash array to the controller via the bus; and
  an engine coupled to the input/output circuit for transmitting a cyclic redundancy check code corresponding to the predetermined data to the controller,
 wherein the controller calculates a first value according to the predetermined data and performs a cyclic redundancy check according to the first value and the cyclic redundancy check code to determine whether a transmission error has occurred, and
 wherein if the transmission error has occurred, the controller re-transmits the read command and the corresponding read address.

16. The non-volatile memory device as claimed in claim 15, wherein the engine transmits the cyclic redundancy check code to the controller in response to a cyclic redundancy check command received from the controller.

* * * * *